United States Patent [19]

Bickley et al.

[11] Patent Number: 5,430,441
[45] Date of Patent: Jul. 4, 1995

[54] TRANSPONDING TAG AND METHOD

[75] Inventors: Robert H. Bickley; Theodore W. Keller, both of Scottsdale; John Bjornholt, Mesa, all of Ariz.

[73] Assignee: Motorola, Inc., Schaumburg, Ill.

[21] Appl. No.: 133,937

[22] Filed: Oct. 12, 1993

[51] Int. Cl.⁶ ............................................. H04Q 1/00
[52] U.S. Cl. ............................ 340/825.54; 340/572; 235/375
[58] Field of Search .................. 340/825.54, 825.55, 340/825.34, 572, 573; 342/42, 44, 51; 343/767; 235/451, 488, 380, 382, 375

[56] References Cited

U.S. PATENT DOCUMENTS

| | | | |
|---|---|---|---|
| 4,068,232 | 1/1978 | Meyers et al. | 343/6.8 R |
| 4,075,632 | 2/1978 | Baldwin et al. | 343/6.8 R |
| 4,242,663 | 12/1980 | Slobodin | 340/152 |
| 4,360,810 | 11/1982 | Landt | 343/6.5 R |
| 4,471,344 | 9/1984 | Williams | 340/572 |
| 4,630,044 | 12/1986 | Polzer | 340/825.54 |
| 4,656,463 | 4/1987 | Anders et al. | 340/572 |
| 4,663,625 | 5/1987 | Yewen | 340/825.54 |
| 4,739,328 | 4/1988 | Koelle et al. | 342/44 |
| 4,746,830 | 5/1988 | Holland | 310/313 |
| 4,783,646 | 11/1988 | Matsuzaki | 340/572 |
| 4,816,839 | 3/1989 | Landt | 343/795 |
| 4,864,158 | 9/1989 | Koelle et al. | 307/231 |
| 4,888,473 | 12/1989 | Rossi et al. | 235/376 |
| 4,999,636 | 3/1991 | Landt et al. | 342/90 |
| 5,030,807 | 7/1991 | Landt et al. | 235/375 |
| 5,049,857 | 9/1991 | Plonsky et al. | 340/551 |
| 5,119,104 | 6/1992 | Heller | 342/450 |
| 5,182,544 | 1/1993 | Aquilera et al. | 340/572 |
| 5,241,299 | 8/1993 | Appalucci et al. | 340/572 |
| 5,313,052 | 5/1994 | Watanabe et al. | 235/375 |

*Primary Examiner*—Donald J. Yusko
*Assistant Examiner*—Gregg V. Miller
*Attorney, Agent, or Firm*—Frederick M. Fliegel

[57] ABSTRACT

A transponding tag (14) and method for responding with a unique code signal (18) when it receives an interrogation signal (16). The tag (14) waits a random duration before responding to avoid interference with response code signals (18) from other tags (14). The tag (14) includes two antennae (22, 24) formed on opposing sides of a dielectric planar substrate (20). A protective coating (52) and printed indicia (72) overlie the antennae. An electrical circuit (34), decoupling capacitor (44) and inductive pickup coil (46) are embedded within the substrate (20). The electrical circuit (34) and capacitor (44) reside between the antennae (22, 24) to receive RF shielding from the antennae and to reduce thickness of the tag (14). A capacitance exists between the antennae (22, 24). This capacitance stores DC electrical energy for the electrical circuit (34). The tag (14) is programmed through a modulated magnetic field detected at the inductive pickup coil (46).

26 Claims, 3 Drawing Sheets

TRANSPONDING TAG AND METHOD

TECHNICAL FIELD OF THE INVENTION

The present invention relates generally to RF communications. More specifically, the present invention relates to active and passive transponders which broadcast response codes when they receive interrogation signals.

BACKGROUND OF THE INVENTION

Various systems use transponders to identify objects from a distance. Transponders attach to or are otherwise associated with the objects to be identified. The transponders are programmed with unique identification codes. Typically, an interrogator transmits an interrogation signal. When a transponder receives the interrogation signal, it responds by broadcasting its unique identification code. The interrogator identifies the transponder and the object with which it is associated by detecting this identification code.

Numerous diverse applications currently use such identifying transponders. However, the high cost, excessive bulk and poor reliability of conventional transponders prevent their use in numerous other applications. A highly reliable, small transponder which may be provided at such a low cost that it may be regarded as a simple "tag" is needed to permit these and many other applications to identify objects from a distance. These applications may include, for example, tags for identifying luggage, employees, vehicles, goods being manufactured, goods in inventory and many others.

As an example, conventional small and inexpensive transponders use a circuit board about the size of a credit card. In order to minimize bulk, reduce complexity, and improve reliability, such transponders may be configured as passive transponders. In other words, such transponders may not include their own source of electrical energy, such as a battery. Rather, they may obtain the energy required for their operation from the interrogation signal itself. The response signal may be broadcast by modulating the reflectivity of the transponder to the interrogation signal rather than by actively sourcing and radiating an RF signal.

Such conventional transponders use an antenna printed on one portion of the circuit board and mount various discrete, individually packaged electrical components, such as semiconductor chips, diodes, resistors, capacitors, inductors and the like on remaining portions of the circuit board. The antenna size is limited due to the need to allocate circuit board area to the electrical components. This limited antenna size likewise limits the transponder's ability to collect electrical energy from the interrogation signal. A slow or weak response signal results.

Moreover, the individually packaged, discrete electrical components mounted on the circuit board cause the transponder to be undesirably thick. The individually packaged components typically must be protected from the elements by placing the transponder within yet another package or housing. This overall transponder package or housing further increases the transponder's thickness. This excessive thickness prevents, for example, the transponder from being carried in a wallet. Likewise, this thickness prevents the transponder from being used in many applications because the transponder would impose an obstruction that would physically interfere with movement or normal jostling experienced by an object to which it might be attached.

Furthermore, the individually packaged, discrete electrical components mounted on the circuit board cause the transponder to be undesirably complex and unreliable. Complexity increases, due to the individual packaging material and processing, the additional overall transponder housing and the increased handling and testing associated with the individually packaged components. Reliability decreases due the minimal shielding provided for such components, leading to interference and other noise-related problems caused by strong interrogation signals and other electrical fields. The interference may cause improper response signals and even corrupted programming for identification codes stored within the transponder.

SUMMARY OF THE INVENTION

Accordingly, it is an advantage of the present invention that an improved transponding tag is provided.

Another advantage is that the present invention provides a reliable transponding tag.

Another advantage is that the present invention provides a relatively thin transponding tag.

Yet another advantage is that the present invention provides a medium with surfaces suitable for printing.

The above and other advantages of the present invention are carried out in one form by a transponding tag for responding to an interrogation signal. The tag includes a dielectric member that has first and second substantially opposing sides. A first conductive layer resides on the first side of the dielectric member. This first conductive layer has a slot across which the interrogation signal develops an electrical field. A second conductive layer resides on the second side of the dielectric member. An electrical circuit resides within the dielectric member between the first and second conductive layers. The electrical circuit electrically couples to the first layer at opposing sides of the slot.

BRIEF DESCRIPTION OF THE DRAWING

A more complete understanding of the present invention may be derived by referring to the detailed description and claims when considered in connection with the Figures, wherein like reference characters refer to similar items throughout the Figures, and:

Figure 1:
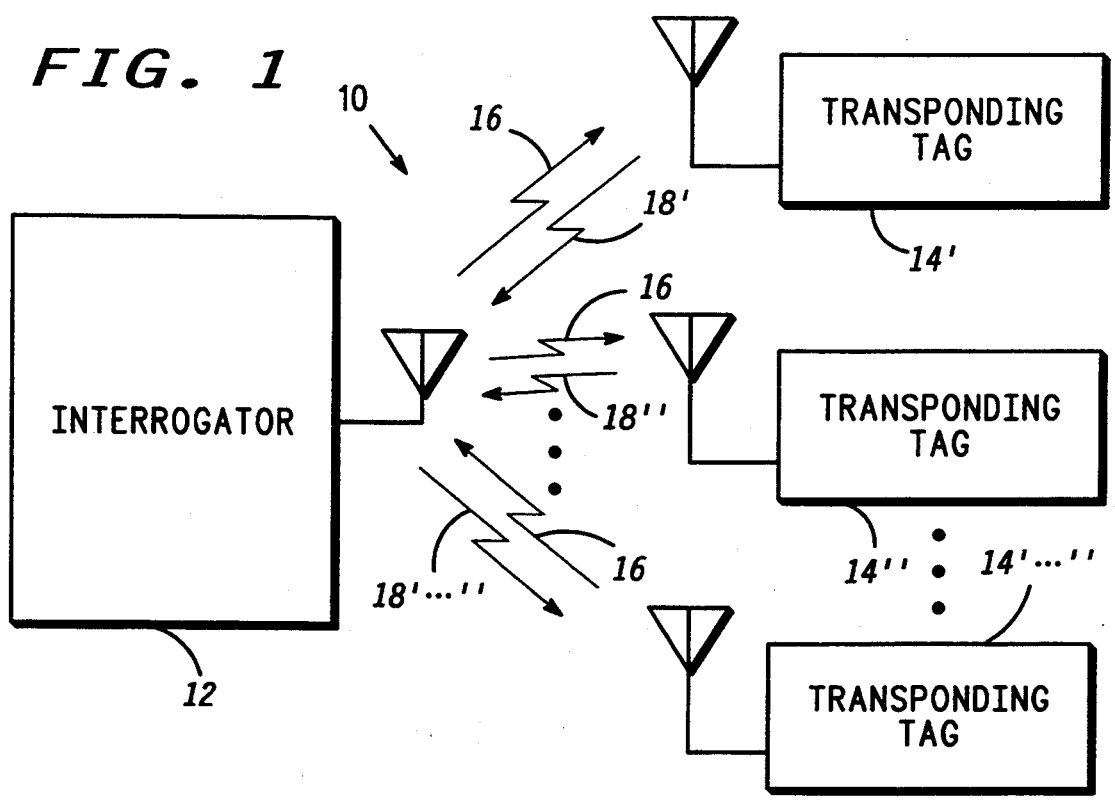
FIG. 1 shows a block diagram of a system which uses transponding tags in accordance with the teaching of the present invention.

In the Figures and following description of preferred embodiments, certain items are either identical or similar to other items. Such items are distinguished from their counterparts by primes ("'", "''", and so on) which are appended to a common reference number. When primes are omitted, the description refers to any one of such items and their counterparts individually or to all of them collectively.

DETAILED DESCRIPTION OF THE DRAWING

FIG. 1 shows a block diagram of RF communication system 10. System 10 includes interrogator 12 and any number of transponding tags 14', 14" and so on to 14'...". Typically, each of tags 14 is physically associated with its own object (not shown) and the tags and objects are remotely located from interrogator 12.

In operation, each of tags 14 may be preprogrammed with its own unique response code or any other code. The response code may be of any length. At some point in time, interrogator 12 transmits an interrogation signal 16. In the preferred embodiments, interrogator 12 transmits interrogation signal 16 in the industrial, scientific and medical bands around 915 MHz, 2450 MHz or 5800 MHz, but this is not a requirement. Some, possibly more than one and possibly less than all, of tags 14 may be positioned to detect interrogation signal 16. Each of tags 14'-14'..." which receives interrogation signal 16 transmits its own response code signal 18'-18'...", respectively. Interrogator 12 may detect response code signals 18 and decode response codes conveyed thereby. By detecting response codes, interrogator 12 may identify tags 14 and their corresponding objects and/or take any appropriate action suggested by the detected codes.

Tags 14 may be configured either as active transponders or passive transponders. Active transponders typically include their own power source, such as a battery (not shown), actively source and radiate response signals 18, allowing system 10 to successfully operate with relatively large distances between interrogator 12 and tags 14. By comparison, passive transponders typically develop their power source from interrogation signal 16 and broadcast or disseminate response codes by modulating the reflectivity of the antenna which is reflecting interrogation signal 16, and allow system 10 to successfully operate at smaller distances between interrogator 12 and tags 14.

Figure 2:
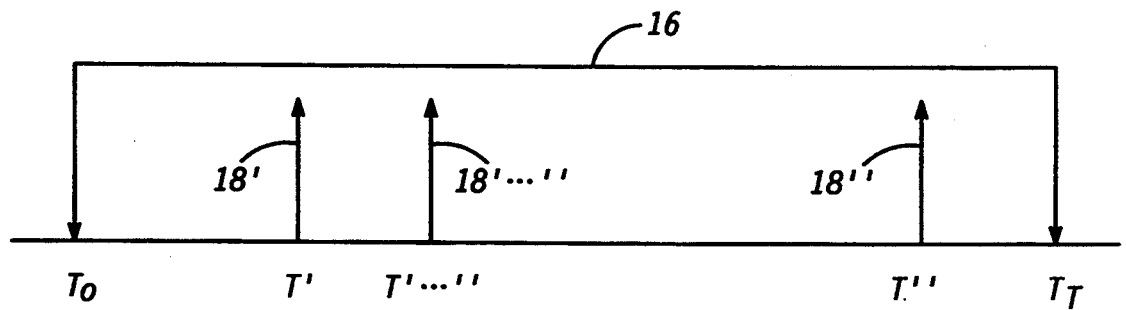
FIG. 2 shows a timing diagram which depicts exemplary transponding tag responses to an interrogation signal.

FIG. 2 shows a timing diagram which depicts exemplary signals 18 responding to interrogation signal 16 in a passive transponder system. In the example depicted in FIG. 2, interrogator 12 (see FIG. 1) begins to transmit interrogation signal 16 at time $T_0$. Interrogator 12 transmits signal 16 on a substantially continuous basis until time $T_T$. The duration between times $T_0$ and $T_T$ is not a critical parameter in the present invention and may vary widely from system to system, however, this duration must be long enough to allow tag 14 (see FIG. 1) to charge the associated storage capacitance and respond. In the preferred embodiments, tags 14 which detect interrogation signal 16 do so quickly. Any delay between time $T_0$ and the actual detection of interrogation signal 16 within tags 14 may be ignored for the present purposes.

When tags 14 detect interrogation signal 16 at around time $T_0$, they wait a random duration before broadcasting their response code signals 18. In some applications, the random duration may be accurately controlled or determined and the delay value reported in the transmitted data stream. Due to this random duration, the wait period most probably differs from one tag 14 to another tag 14 and from interrogation to interrogation. After each tag 14 waits its random duration, it broadcasts its response code signal 18. In the example depicted in FIG. 2, tag 14' broadcasts its response code signal 18' at time $T_a$, then tag 14'..." broadcasts its response code signal 18'..." at time $T'...$", then tag 14" broadcasts its response code signal 18" at time $T''$.

Preferably, each tag 14 broadcasts its response signal 18 for only a brief duration. Thus, the likelihood of any two response code signals 18 being broadcast at the same time is small and interference which would result from response code signal collisions is unlikely. If, for example, response code signals 18 are each broadcast for a duration which is around 0.01% of the duration between $T_0$ and $T_T$, and around 100 of tags 14 are within range of interrogator 12 (see FIG. 1), then the chances of any two particular response signals 18 occurring at the same time is only around 1%. The odds of missing response codes due to the rare collisions may be reduced further by conducting multiple interrogations on a population of tags 14.

Figure 3:
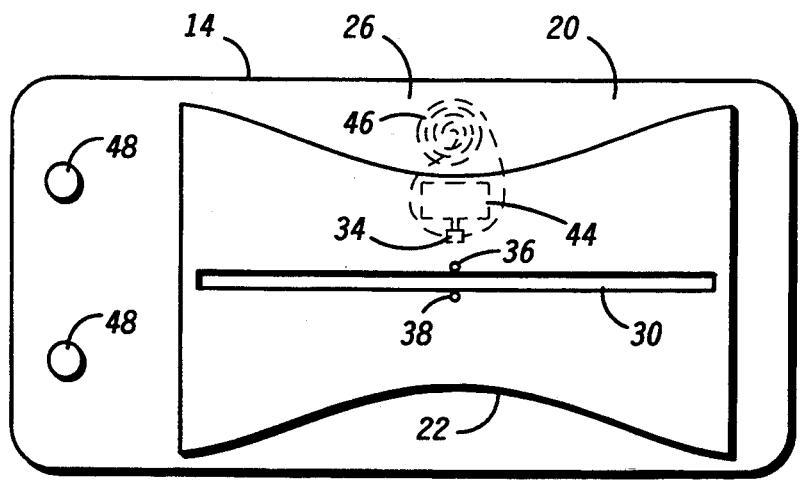
FIG. 3 shows a top view of a transponding tag prior to the application of a protective laminate coating and printing.
Figure 4:
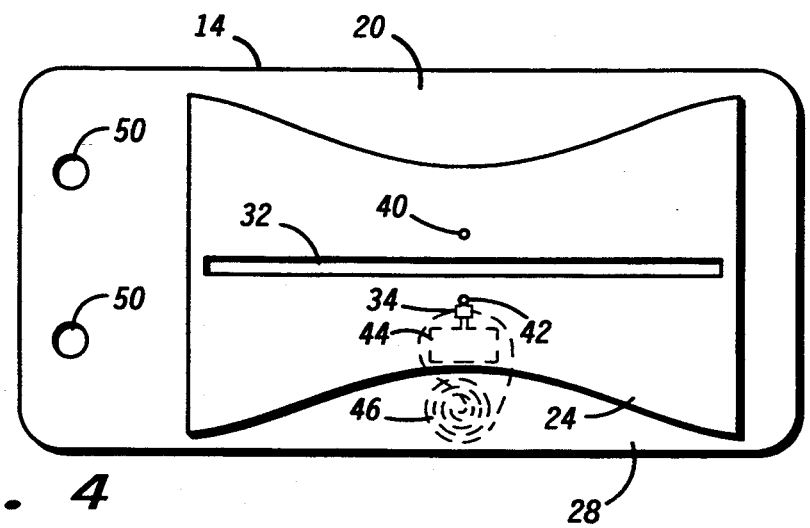
FIG. 4 shows a bottom view of the transponding tag prior to the application of the protective laminate coating and printing.

FIGS. 3–6 illustrate physical characteristics of tag 14 constructed in accordance with the present invention. FIG. 3 shows a top view of tag 14 prior to the application of a protective laminate and printed indicia (both discussed infra). FIG. 4 shows a bottom view of the same tag 14 at the same processing stage. Referring to FIGS. 3 and 4, tag 14 may be formed in a rectangular shape to resemble a credit card in both size and shape. Those skilled in the art will appreciate that a credit card size and shape are convenient for human handling, but that the present invention is in no way limited to exhibiting only this shape and size.

Tag 14 includes preferably planar, dielectric substrate 20. Substrate 20 carries a bi-planar slot antenna system including top antenna 22 and bottom antenna 24. Relatively thin conductive foil layers attached to top and bottom surfaces 26 and 28 of substrate 20 form antennae 22 and 24, respectively. Antennae 22 and 24 are configured so that conductive foil covers a substantial portion of surfaces 26 and 28, respectively. In the preferred embodiments, this area is around 12.5 cm$^2$ (circa 2.0 in$^2$) or more on each of surfaces 26 and 28. In the embodiment of the present invention illustrated in FIGS. 3 and 4, antennae 22 and 24 are each etched to approximate a bow-tie shape on top and bottom surfaces 26 and 28, respectively.

In an alternate configuration, antenna(e) 22 and/or 24 may be an external "whip" (e.g., center fed dipole) having balanced connections to RF terminals (e.g., 36, 38 and/or 40, 42) of tag 14 and having an appropriate radiation pattern. "Bow tie" portions may then usefully be disconnected from the RF terminals and serve as shields.

Antennae 22 and 24 include slots 30 and 32, respectively, extending generally along the longer dimensions of antennae 22 and 24 and of substrate 20. In one embodiment configured to operate in connection with 2450 MHz interrogation signals 16, slots 30 and 32 may each be around 6 cm (circa 2.45 inches) long and around 0.15 cm (circa 0.060 inch) wide. Slots 30 and 32 represent absences of conductive foil in areas of antennae 22 and 24 that are surrounded by conductive foil. In the presence of interrogation signal 16, antennae 22 and 24 develop electric fields across the narrower dimensions of slots 30 and 32, respectively. Thus, tag 14 couples electrical circuit 34 to antenna 22 on opposing sides of slot 30 via feedthroughs 36 and 38 and couples electrical circuit 34 to antenna 24 on opposing sides of slot 32 via feedthroughs 40 and 42.

Electrical circuit 34, along with planar decoupling capacitor 44 and inductive pickup coil 46 reside within substrate 20 in the preferred embodiments of the present invention, and are illustrated in FIGS. 3-4 by dotted lines. Preferably, electrical circuit 34 and capacitor 44 reside inside substrate 20 between the conductive foils which form antennae 22 and 24. Preferably, inductive pickup coil 46 is positioned to avoid the overlying conductive foil of antennae 22 and 24. In alternate embodiments, coil 46 may reside in any plane which substantially parallels the planes in which antennae 22 and 24 reside, including either or both of the same planes where antennae 22 and 24 reside.

The relatively large, planar, spaced apart, conductive layers which form antennae 22 and 24 exhibit a capacitance therebetween which, in the preferred embodiments, may be between 100 and 300 pF. This capacitance stores DC energy to aid in the operation of electrical circuit 34 (e.g., supply current therefor). In addition, it shields electrical circuit 34 and capacitor 44 from RF energy, such as interrogation signals. Consequently, tags 14 may reliably operate in the presence of strong interrogation and other signals.

Generally speaking, electrical circuit 34 detects interrogation signal 16, stores a response code and causes tag(s) 14 to broadcast response code signal(s) 18 (see FIGS. 1-2). Decoupling capacitor 44 is an optional component which reduces supply voltage ripple beyond that achievable through the capacitance provided between antennae 22 and 24 alone. Inductive pickup coil 46 may be brought into close proximity with and magnetically couple to a inductive programming coil (not shown) to program a response code into tag 14. The use of a communication scheme other than RF signals received through antennae 22 and 24 for programming response codes into tag 14 improves reliability because it reduces the chances that noise, RF sabotage or meddling received through RF paths within electrical circuit 34 will alter response code programming.

Substrate 20 optionally carries conductive nodes 48 on its top surface 26. Nodes 48 allow tag 14 to operate as an active transponder by attaching a battery pack (not illustrated) to substrate 20. Electrical energy may flow from the battery pack through nodes 48 to electrical circuit 34 via conductive feedthroughs and traces formed within substrate 20. Indentions 50 are optionally formed in bottom surface 28 of substrate 20 to serve as a detent that allows removable fastening of such a battery back to substrate 20. However, as discussed above, tag 14 may also be configured as a passive transponder which does not include a battery pack, nodes 48 or indentions 50.

Figure 5:
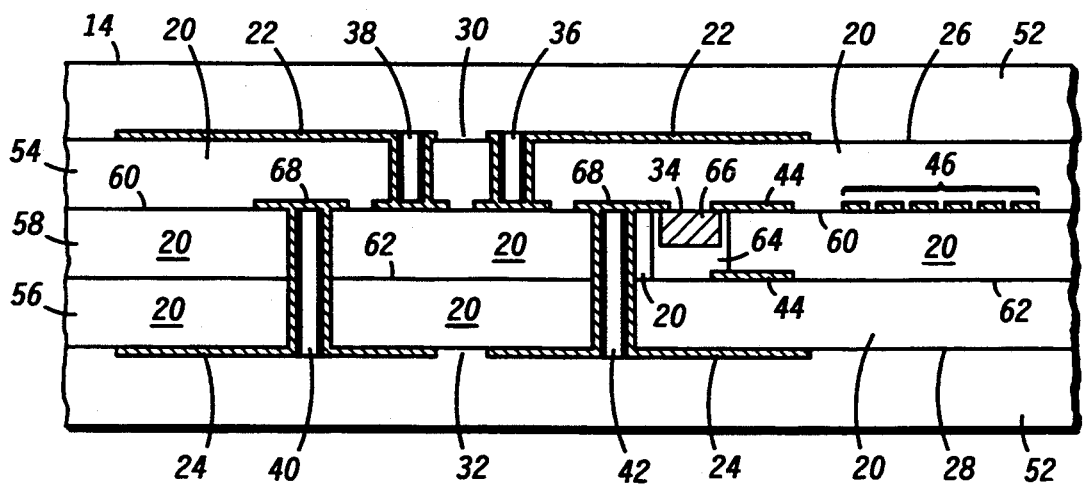
FIG. 5 shows a cross-sectional side view of a portion of the transponding tag.

FIG. 5 shows a cross-sectional side view of a portion of tag 14 after application of protective coating 52 which surrounds substrate 20, antennae 22 and 24, electrical circuit 34 and the like. In the preferred embodiments of the present invention, no electrical component or device extends above or below coating 52, other than the optional battery pack discussed above. Coating 52 is usefully laminated over top surface 26 and bottom surface 28 of substrate 20 using conventional lamination processes. Coating 52 provides additional physical strength to tag 14 while protecting the dielectric materials, antennae and electronic components included in tag 14 from environmental elements. With the possible exception of contacts 48 (see FIG. 3), tag 14 desirably has no exposed metal. In addition, coating 52 gives tag 14 exposed flat surfaces which are particularly suited to displaying writing, graphics, advertising, instructions or other printed indicia.

FIG. 5 also illustrates details of substrate 20 and the components residing therein. Substrate 20 desirably includes a plurality (preferably three) of planar dielectric layers sandwiched together. Top dielectric layer 54 provides top surface 26 of substrate 20, and bottom dielectric layer 56 provides bottom surface 28 of substrate 20. Middle dielectric layer 58 is positioned between top and bottom layers 54 and 56. Top-inside surface 60 resides at the junction between top and middle layers 54 and 58 while bottom-inside surface 62 resides at the junction between bottom and middle layers 56 and 58.

In the preferred embodiment, each of layers 54, 56 and 58 is made from the same relatively inexpensive material, which may be a plastic, Epoxy, Mylar, Nylon or other dielectric substrate material known to those skilled in the art. Each layer is preferably around the same thickness, which is around 0.0125 cm (circa 0.005 inch) in one preferred embodiment and each layer exhibits about the same relative dielectric constant, which is around four in the same preferred embodiment.

Middle layer 58 includes hole 64 dimensioned to receive semiconductor chip 66. Chip 66 is preferably a tab-bondable semiconductor chip die, possibly a BIC-MOS device, that tab bonds to conductive foil traces 68 formed at top-inside surface 60. Thus, chip 66 is thinner than middle layer 58 so that it entirely resides in hole 64. In the preferred embodiment, chip 66 embodies all of electrical circuit 34. However, those skilled in the art could devise other versions of tag 14 that install additional chips or other components in other holes in middle layer 58. Such other chips could interconnect through traces 68.

Conductive foil patterns are formed on surfaces of layers 54, 56 and 58 using conventional techniques, such as metalization, pattern printing and etching. These patterns form antennae 22 and 24 on top and bottom surfaces 26 and 28 of substrate 20. These patterns desirably also form capacitor 44 and inductive pickup coil 46, discussed above, and traces 68 which electrically couple antenna 22, antenna 24, capacitor 44 and inductive pickup coil 46 to electrical circuit 34.

Capacitor 44 is formed from overlying conductive foil layers in the form of plates at top-inside surface 60 and bottom-inside surface 62. The plates of capacitor 44 are separated by the thickness of dielectric substrate layer 58. In the preferred embodiment, these plates overlie each other for an area of around 0.625 cm$^2$ (circa 0.1 in$^2$) or more. A capacitance of around 18 pF or more results.

Feedthroughs 36 and 38 connect antenna 22 to traces 68 at top-inside surface 60. Feedthroughs 40 and 42 connect antenna 24 to traces 68 at top-inside surface 60. Other feedthroughs (not shown) connect the plate of capacitor 44 that resides on bottom-inside surface 62 to traces 68 at top-inside surface 60, and nodes 48 (see FIG. 3) on top surface 26 of substrate 20 to traces 68 at top-inside surface 60. Inductive pickup coil 46 is preferably formed at top-inside surface 60 to reduce manufacturing costs. No feedthroughs are required to electrically couple coil 46 to electrical circuit 34 embodied in semiconductor chip 66. Feedthroughs 36, 38, 40, 42 and others (not shown) are formed using conventional processes, such as by drilling or punching holes and electroplating or by strap welding through large apertures.

During assembly, numerous tags 14 may be constructed together in a batch. Conductive patterns may first be formed on dielectric layers 54, 56 and 58 individually, and hole 64 formed in layer 58. Then, semiconductor chip 66 may be attached to top layer 54 using a tape-automated or other bonding process. Layers 54, 56 and 58 may then be laminated together, causing chip 66 to be placed within hole 64. Next, the feedthroughs are formed. Tag 14 may then be tested. After testing, protective coating 52 may be applied along with printed indicia, and individual tags 14 separated from one another. The per-unit material costs of tags 14 are very low, and these assembly processes lend themselves to automation. Consequently, a low complexity, readily manufactured transponding tag 14 results.

Figure 6:
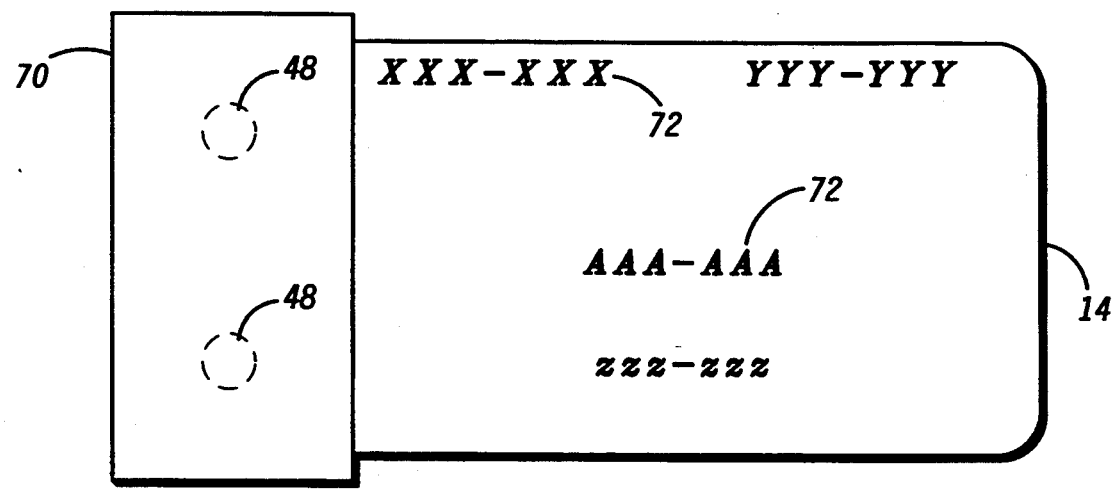
FIG. 6 shows a top view of a transponding tag which has been configured as an active transponder.

FIG. 6 shows a top view of one embodiment of tag 14 after assembly. The FIG. 6 embodiment represents an active transponder. Thus, battery pack 70 is installed on the end of tag 14 which carries nodes 48 (see FIG. 3). Of course, those skilled in the art will appreciate that external power sources and/or battery pack 70 may be omitted in passive transponder versions of tag 14.

In addition, printed indicia 72 have been applied to tag 14. Printed indicia 72 may be applied over protective coating 52 (see FIG. 5) or included under coating 52. Due to the planar nature of tag 14, indicia 72 may be applied over electrical circuit 34, antennae 22 and 24 and the like (see FIG. 3). The large, flat surface of tag 14 represents a desirable medium for presenting printed information, such as advertising or instructions.

Figure 7:
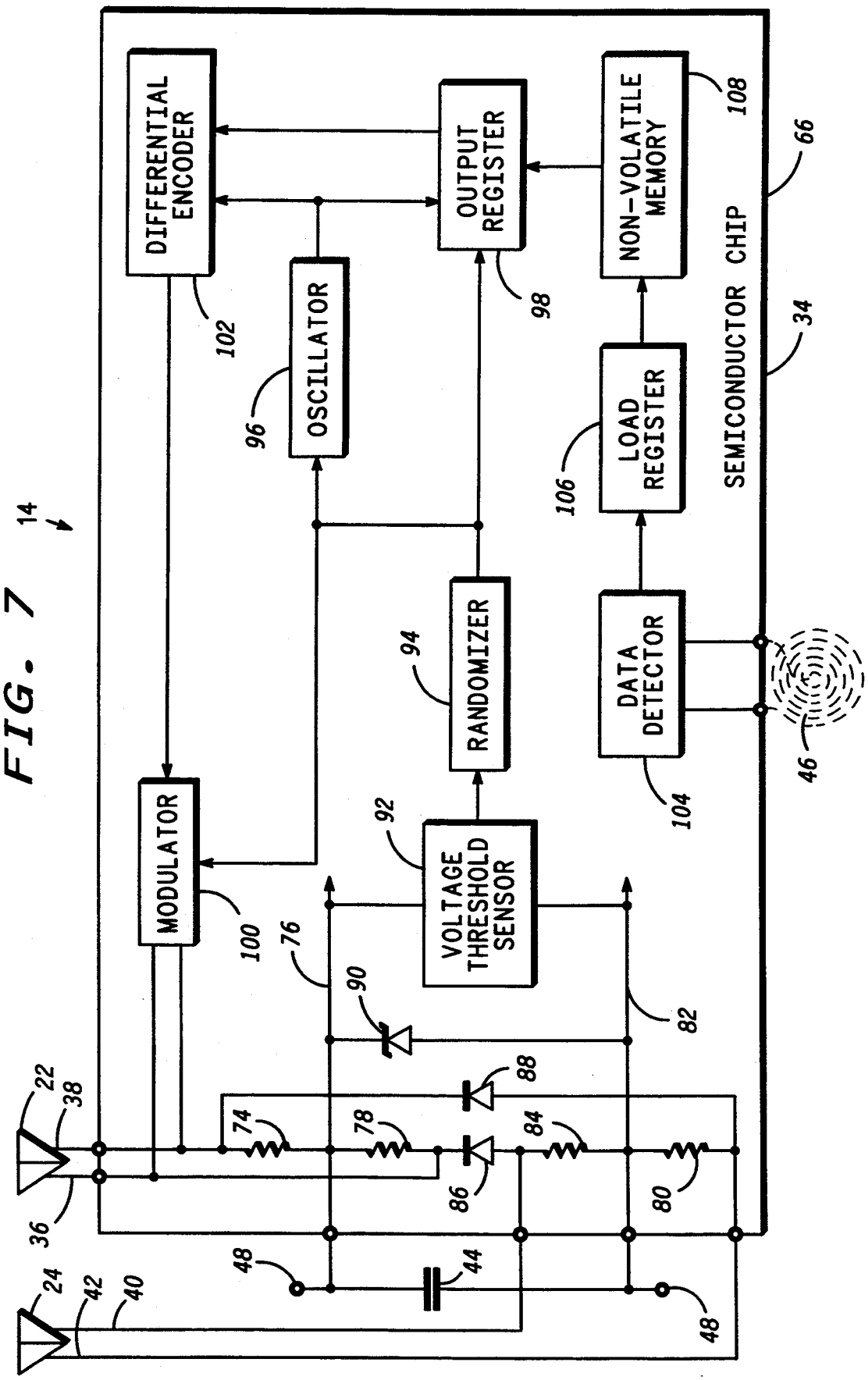
FIG. 7 shows a block diagram of an electrical circuit utilized by the transponding tag.

FIG. 7 shows a block diagram of electrical circuit 34 used in one embodiment of passive transponder version of tag 14. FIG. 7 also shows how circuit 34 couples to antenna 22, antenna 24, capacitor 44 and inductive pickup coil 46. In this embodiment, tag 14 requires no other electrical components. Alternatively, nodes 48 (FIG. 3) may supply DC power.

As discussed above, antenna 22 couples to electrical circuit 34 through feedthroughs 36 and 38, and antenna 24 couples to electrical circuit 34 through feedthroughs 40 and 42. Feedthroughs 36 and 38 reside on opposing sides of slot 30 (see FIG. 3) in antenna 22, and feedthroughs 40 and 42 reside on opposing sides of slot 32 (see FIG. 4) in antenna 24. A rectifying circuit in electrical circuit 34 includes resistor 74 that couples between feedthrough 38 and positive voltage node 76, and resistor 78 that couples is between feedthrough 36 and positive node 76. Likewise, resistor 80 couples between feedthrough 42 and negative voltage node 82, and resistor 84 couples between feedthrough 40 and negative node 82. A cathode of Shottky diode 86 couples to feedthrough 36, and a cathode of Shottky diode 88 couples to feedthrough 38. Anodes of diodes 86 and 88 couple to feedthroughs 40 and 42, respectively.

Diodes 86 and 88 rectify interrogation signal 16 (see FIGS. 1-2) and generate, with the aid of capacitance (not shown) formed between the conductive foil of antennae 22 and 24, a DC voltage across nodes 76 and 82. Thus, nodes 76 and 82 supply a DC voltage to the remainder of the active components in circuit 34. However, FIG. 7 illustrates nodes 76 and 82 as being coupled only to Zener diode 90 and voltage threshold sensor 92 for clarity. The capacitance developed across overlying plates of antennae 22 and 24 stores energy from this DC voltage. In addition, capacitor 44 couples across nodes 76 and 82 to reduce any RF energy or ripple in this DC supply voltage not otherwise removed by the capacitance of antennae 22 and 24.

When interrogation signal 16 (see FIGS. 1-2) is absent, no DC voltage develops across nodes 76 and 82. Any electrical energy previously stored between antennae 22 and 24 and in capacitor 44 quickly dissipates. Voltage threshold sensor 92, which may be provided by a comparator circuit or the like, generates an output signal that exhibits a disabled state. The active components of circuit 34 are de-energized or otherwise disabled. Tag 14 does not broadcast its response code signal 18 (see FIGS. 1-2).

When tag 14 initially receives interrogation signal 16, the DC supply voltage begins to build. When this voltage builds to a predetermined level, voltage threshold sensor 92 switches to an enabled state. When this output signal exhibits its enabled state, tag 14 has detected the presence of interrogation signal 16. As this voltage continues to build, the output from sensor 92 remains enabled, and Zener diode 90 prevents the voltage from building to a level that might damage active components of circuit 34.

The output of voltage threshold sensor 92 couples to a trigger or enable input of randomizer 94. An output of randomizer 94 couples to an enable input of oscillator 96, to an enable or load input of output register 98 and to an enable input of modulator 100. An output of oscillator 96 couples to clock inputs of output register 98 and differential encoder 102. Inductive pickup coil 46 couples to data detector 104. An output of data detector 104 couples to load register 106, and an output of load register 106 couples to a data input of non-volatile memory 108. A data output of memory 108 couples to a data input of output register 98. A data output of register 98 couples to a data input of differential encoder 102 and a data output of encoder 102 couples to an input of modulator 100. Output nodes of modulator 100 couple to one or more of antennae 22 and 24.

When tag 14 detects the presence of interrogation signal 16, randomizer 94 becomes enabled or is otherwise triggered. Randomizer 94 is a timer that measures a random duration. When tag 14 initially detects interrogation signal 16, randomizer 94 begins timing. Conventional techniques may be used to define a random value that controls the timing duration. Preferably, and particularly for passive tags, this random value changes each time randomizer 94 is activated, and this random value desirably corresponds to a wait duration less than the duration of interrogation signal 16. Until randomizer 94 times out, an output signal generated by randomizer 94 exhibits a disabled state. This causes output register 98 and modulator 100 to remain inactive. Tag 14 does not broadcast its response code signal 18 (see FIGS. 1-2).

In some cases (e.g., range determination), turn around time is critical and the randomizer delay value and the factory calibrated tag synchronization detector are usefully entered into the data stream. For these cases, an accurate, external clock and synchronization detector (not shown) are desirable and randomizer 94 derives timing from the external clock.

When randomizer 94 eventually times out, the randomizer output signal switches to an enabled state. This transfers a response code stored in non-volatile memory 108 to output register 98 and allows oscillator 96 to generate a free-running clock signal. The clock signal serially clocks the response code out of register 98. Differential encoder 102 mixes the response code bit stream with the clock signal, and applies this clock-encoded response code to modulator 100.

Modulator 100 modifies the RF impedance of antennae 22 and/or 24 in response to the clock-encoded response code. Modulator 100 may, for example, be a varactor or switching component that couples to antennae 22 and/or 24. As the impedance of antennae 22 and/or 24 changes in response to the clock-encoded response code, the amount of RF energy from interrogation signal 16 reflected away from tag 14 changes. Interrogator 12 (see FIG. 1) may use conventional and reliable techniques to detect these changes, recover the clock signal from the clock-encoded response code, and identify the response code using this clock.

By broadcasting both the clock and response code from tag 14, interrogator 12 may obtain and use the tag's clock signal to decode the tag's response code. This is a reliable decoding technique which accommodates a wide variation in data rates from one tag 14 to another tag 14. Consequently, the characteristics of oscillator 96 which establish the clock rate need not be tightly controlled, and the present invention easily tolerates inexpensively generated, low accuracy clock signals without compromising system reliability.

The response code is programmed into tag 14 through inductive pickup coil 46. First, tag 14 is placed in the presence of an interrogation or other signal which allows tag 14 to energize. Coil 46 may then experience a modulated magnetic field produced by a similar coil (not shown) which has been placed near coil 46. Preferably, this magnetic field conveys both a clock signal and a response code. In one embodiment, the clock signal may be derived from and correspond to the clock signal produced by oscillator 96 and broadcast from tag 14 to assure correct data/clock timing into the system.

Data detector 104 decodes the response code from the signal detected through coil 46 and provides a stream of response code data. This stream of response code data is routed to load register 106, from which it is loaded into non-volatile memory 108. Once written to non-volatile memory 108, the response code remains stored therein regardless of whether or not tag 14 is energized. Of course, tag 14 may be reprogrammed through coil 46 to change the response code. The use of a magnetic induction path for programming tag 14 improves reliability by reducing the vulnerability of programming in tag 14 to RF signals received through antennae 22 and 24.

In summary, the present invention provides an improved transponding tag. The tag of the present invention is reliable due to many factors. For example, the tag is a simple structure, its electrical circuit is shielded from RF interrogation signals and noise by conductive layers that form antennae, and it uses reliable techniques for communicating its response code broadcast and receiving its response code programming. Moreover, numerous tags may be positioned to respond to a single interrogation with only insignificant chances of response collisions due to a randomizer which randomizes durations that tags wait before broadcasting their responses. The tag of the present invention is physically thin due to the omission of individually packaged electrical components and the embedding of electrical components within a planar substrate. The tag is sufficiently thin to be carried in a wallet or to attach to numerous objects without being an obstruction to movement. In addition, the tag of the present invention has external surfaces that lend themselves to displaying information, such as advertising or instructions.

The present invention has been described above with reference to preferred embodiments. However, those skilled in the art will recognize that changes and modifications may be made in these preferred embodiments without departing from the scope of the present invention. For example, the precise nature of the electrical circuit may vary from application to application. Active transponder versions of the present invention, in particular, may benefit from including other or different signal processing or functions in the electrical circuit (e.g., external or internal high accuracy clock and/or synchronization circuitry). In addition, those skilled in the art will appreciate that directional terms, such as top, bottom and the like are used herein only to maintain consistency with the orientations shown in Figures. The present invention requires no particular orientation. These and other changes and modifications which are obvious to those skilled in the art are intended to be included within the scope of the present invention.

What is claimed is:

1. A tag, said tag being a transponding tag for responding to an interrogation signal, said tag comprising:
    a dielectric member having first and second substantially opposing sides;
    a first conductive layer residing on said first side of said dielectric member, said first conductive layer having a slot across which said interrogation signal develops an electrical field;
    a second conductive layer residing on said second side of said dielectric member, said second conductive layer being electrically isolated from said first conductive layer; and
    an electrical circuit residing within said member, said electrical circuit being electrically coupled to said first layer at opposing sides of said slot.

2. A tag as claimed in claim 1 wherein said electrical circuit comprises an integrated circuit semiconductor chip disposed between said first and second conductive layers.

3. A tag as claimed in claim 1 wherein:
    said second conductive layer has a slot therein; and
    said electrical circuit additionally couples to said second conductive layer at opposing sides of said second conductive layer slot.

4. A tag as claimed in claim 1 wherein said dielectric member is substantially planar.

5. A tag as claimed in claim 4 wherein said dielectric member comprises first, second and third dielectric layers.

6. A tag as claimed in claim 5 wherein:
    said second dielectric layer has a hole therein;
    said electrical circuit is thinner than said second dielectric layer; and
    said electrical circuit resides within said hole.

7. A tag as claimed in claim 5 wherein said electrical circuit comprises a capacitor formed from first and second substantially planar conductive areas overlying each other on opposing sides of said second dielectric layer.

8. A tag as claimed in claim 4 wherein:
    said first and second conductive layers reside in substantially parallel planes; and
    said tag additionally comprises an inductive pickup coil residing in a plane substantially parallel to said first and second conductive layers and electrically coupled to said electrical circuit.

9. A tag as claimed in claim 8 wherein said dielectric member comprises first, second and third dielectric layers, and said inductive pickup coil resides within said dielectric member between said first and second dielectric layers.

10. A tag as claimed in claim 1 additionally comprising a protective coating substantially surrounding said dielectric member, said electrical circuit and said first and second conductive layers.

11. A tag as claimed in claim 1 wherein said electrical circuit comprises:
 a DC voltage supply source;
 a memory, coupled to said voltage supply source, for storing a response code; and
 a modulator coupled to said memory and to said first conductive layer, for causing said response code to be broadcast from said tag.

12. A tag as claimed in claim 11 additionally comprising a randomizer, coupled to at least one of said memory and said modulator, for randomizing points in time at which said modulator causes said response code to be broadcast from said tag.

13. A tag as claimed in claim 11 additionally comprising:
 an oscillator, coupled to at least one of said memory and said modulator, for generating a clock signal which defines a rate at which said response code is broadcast from said tag; and
 means, coupled to said oscillator for encoding said clock signal with said response code so that said response code and said clock signal are both broadcast from said tag.

14. A tag as claimed in claim 1 additionally comprising printed indicia overlying at least one of said first and second conductive layers.

15. A method of responding to an interrogation signal, said method comprising steps of:
 receiving said interrogation signal at a transponding tag which includes an antenna having first and second spaced apart conductive layers with at least one slot therein and having an electrical circuit coupled to said antenna, said first and second conductive layers being electrically isolated from each other, wherein said electrical circuit is shielded from said interrogation signal by said first and second layers;
 energizing said electrical circuit in response to said receiving step; and
 responding with a response code from said antenna in response to said energizing step.

16. A method as claimed in claim 15 additionally comprising a step of waiting, after said energizing step, to perform said responding step.

17. A method as claimed in claim 16 wherein said waiting step comprises a step of randomizing a duration which transpires between said energizing and responding steps.

18. A method as claimed in claim 15 additionally comprising a step of storing electrical energy in a capacitance formed from said spaced apart conductive layers of said antenna.

19. A method as claimed in claim 15 additionally comprising steps of:
 receiving, prior to said energizing step, said response code through an inductive pickup coil which couples to said electrical circuit; and
 storing said response code at least until said responding step.

20. A tag, said tag being a transponding tag for responding to an interrogation signal, said tag comprising:
 a substantially planar dielectric member having first and second substantially opposing sides;
 a first conductive layer disposed on said first side of said dielectric member, said first conductive layer having a slot across which said interrogation signal develops a first electrical field;
 a second conductive layer disposed on said second side of said dielectric member, said second conductive layer having a slot across which said interrogation signal develops a second electrical field, said first and second conductive layers being insulated from each other; and
 an integrated circuit semiconductor chip residing within said dielectric member, said integrated circuit semiconductor chip being electrically coupled to said first and second conductive layers.

21. A tag as claimed in claim 20 wherein:
 said dielectric member comprises first, second and third dielectric layers, said second dielectric layer being sandwiched between said first and third dielectric layers, wherein said second dielectric layer has a hole therein; and
 said integrated circuit semiconductor chip resides within said hole.

22. A tag as claimed in claim 21 additionally comprising a capacitor electrically coupled to said integrated circuit semiconductor chip and formed from first and second substantially planar conductive areas overlying each other on opposing sides of said second dielectric layer.

23. A tag as claimed in claim 20 additionally comprising a coil, said coil being a substantially planar inductive pickup coil oriented substantially parallel to said first and second conductive layers, said coil being electrically coupled to said integrated circuit semiconductor chip.

24. A tag as claimed in claim 20 wherein said integrated circuit semiconductor chip comprises:
 means, coupled to said first and second conductive layers, for detecting said interrogation signal;
 a memory, coupled to said detecting means, for storing a response code; and
 a modulator coupled to said memory and to said first and second conductive layers, for causing said response code to be broadcast from said tag.

25. A tag as claimed in claim 24 additionally comprising a randomizer, coupled to said detecting means and at least one of said memory and said modulator, for randomizing points in time at which said modulator causes said response code to be broadcast from said tag.

26. A tag as claimed in claim 20 additionally comprising printed indicia overlying at least one of said first and second conductive layers.

* * * * *